(12) United States Patent
Siodmok

(10) Patent No.: US 11,493,105 B2
(45) Date of Patent: Nov. 8, 2022

(54) METHOD AND DEVICE FOR MANUFACTURING A MONOTUBE SHOCK ABSORBER

(71) Applicant: DRiV Automotive Inc., Lake Forest, IL (US)

(72) Inventor: Tomasz Siodmok, Syrynia (PL)

(73) Assignee: DRiV Automotive Inc., Lake Forest, IL (US)

( * ) Notice: Subject to any disclaimer, the term of this patent is extended or adjusted under 35 U.S.C. 154(b) by 310 days.

(21) Appl. No.: 16/780,322

(22) Filed: Feb. 3, 2020

(65) Prior Publication Data

US 2021/0239177 A1    Aug. 5, 2021

(51) Int. Cl.
*B21D 39/04*    (2006.01)
*F16F 9/32*    (2006.01)
*F16F 9/43*    (2006.01)

(52) U.S. Cl.
CPC .............. *F16F 9/3271* (2013.01); *F16F 9/43* (2013.01); *F16F 2226/04* (2013.01); *F16F 2230/06* (2013.01)

(58) Field of Classification Search
CPC ........ F16F 9/3271; F16F 9/43; F16F 2226/04; F16F 2230/06; B23P 19/001; B23P 11/005; B23P 2700/14; B23P 21/006
See application file for complete search history.

(56) References Cited

U.S. PATENT DOCUMENTS 8,898,899 B2    12/2014    Kim

FOREIGN PATENT DOCUMENTS

| CN | 101101032 | | 1/2008 |
|---|---|---|---|
| CN | 101101032 A | * | 1/2008 |
| CN | 105102851 | | 9/2016 |
| CN | 106499766 | | 3/2017 |
| CN | 107575523 | | 1/2018 |
| CN | 113531026 A | * | 10/2021 |
| EP | 1493940 | | 9/2007 |
| KR | 100827865 | | 5/2008 |
| KR | 100880820 | | 1/2009 |
| KR | 101131052 | | 3/2012 |

OTHER PUBLICATIONS

English translation of CN101101032 (Year: 2008).*
International Search Report for International Application PCT/US2021/016188, dated May 7, 2021.

* cited by examiner

*Primary Examiner* — Jun S Yoo
(74) *Attorney, Agent, or Firm* — Burris Law, PLLC

(57) ABSTRACT

A method for assembling a damper with a device includes inserting a floating piston into a cartridge, filling a region of the cartridge with oil, inserting a piston-rod assembly into the cartridge, inserting a rod guide into the cartridge, coupling a damper tube to the cartridge, supplying a gas into the damper tube via a first end of the damper tube, transferring the floating piston, the piston-rod assembly, the rod guide, and the oil from the cartridge to the damper tube through the first end of the damper tube, and securing the rod guide to the damper tube.

20 Claims, 9 Drawing Sheets

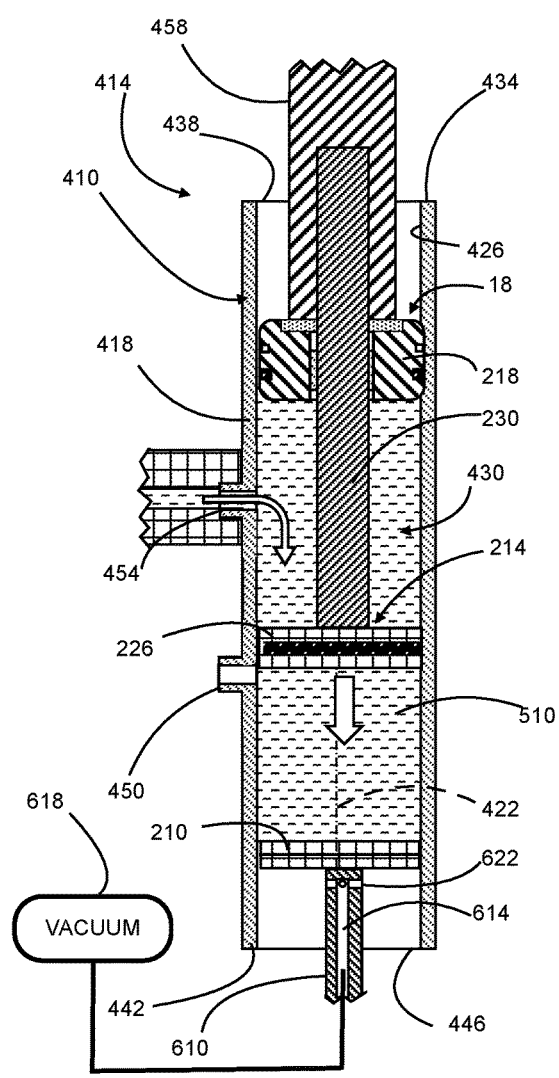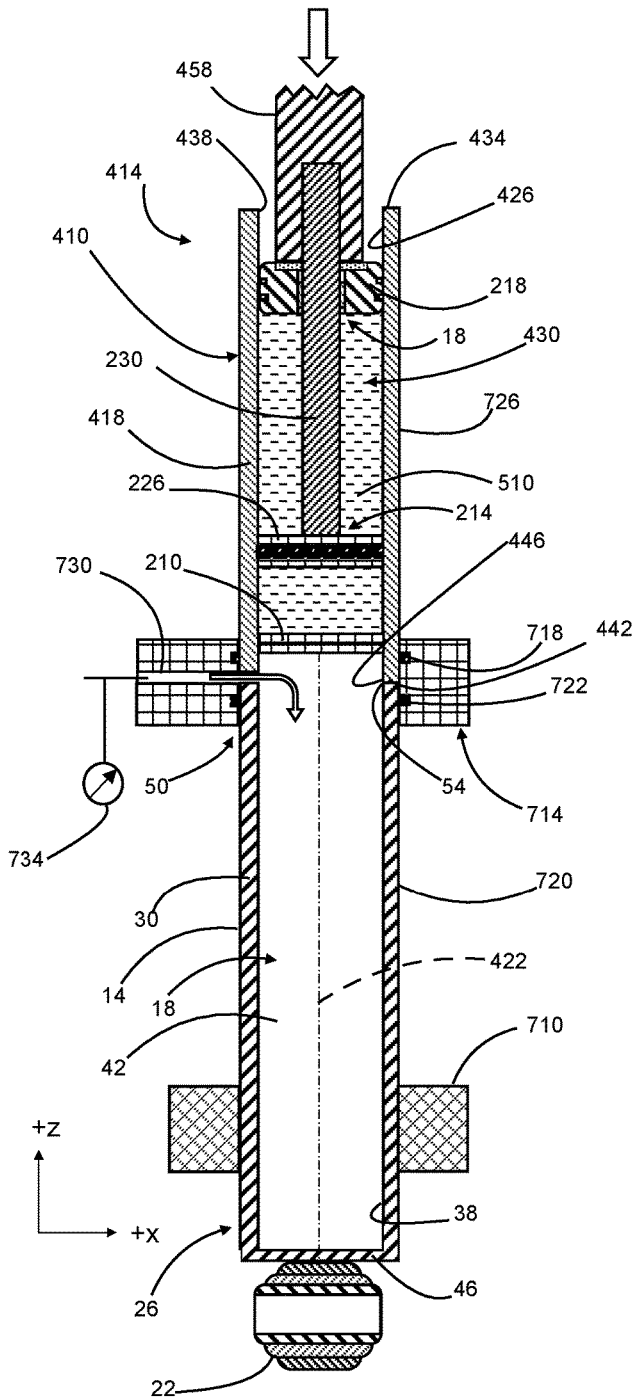
FIG. 6
FIG. 7

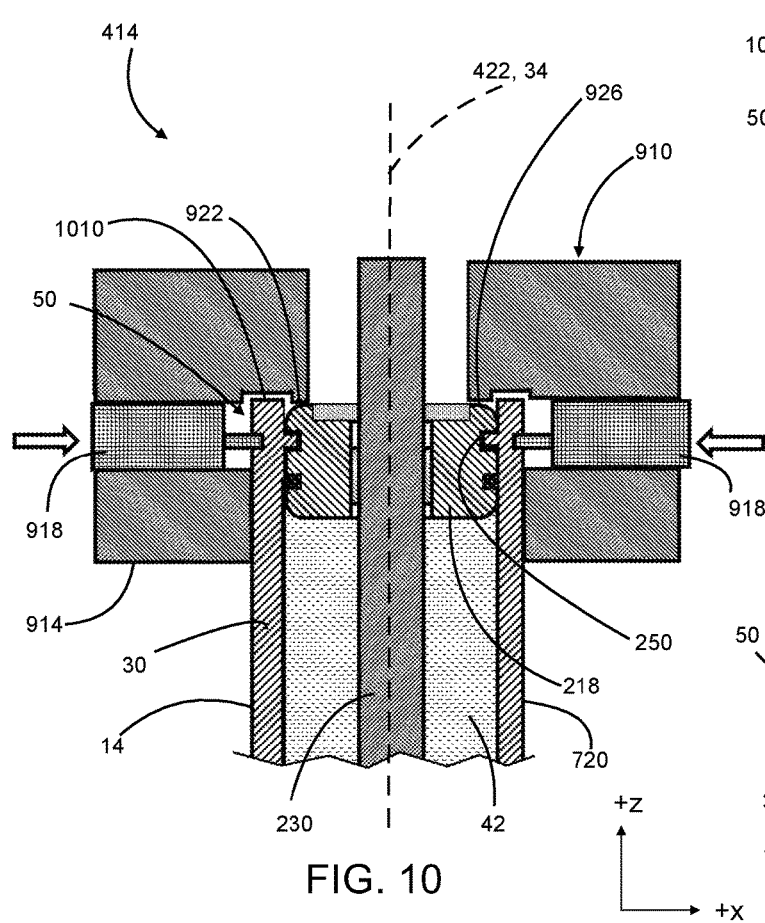
FIG. 10
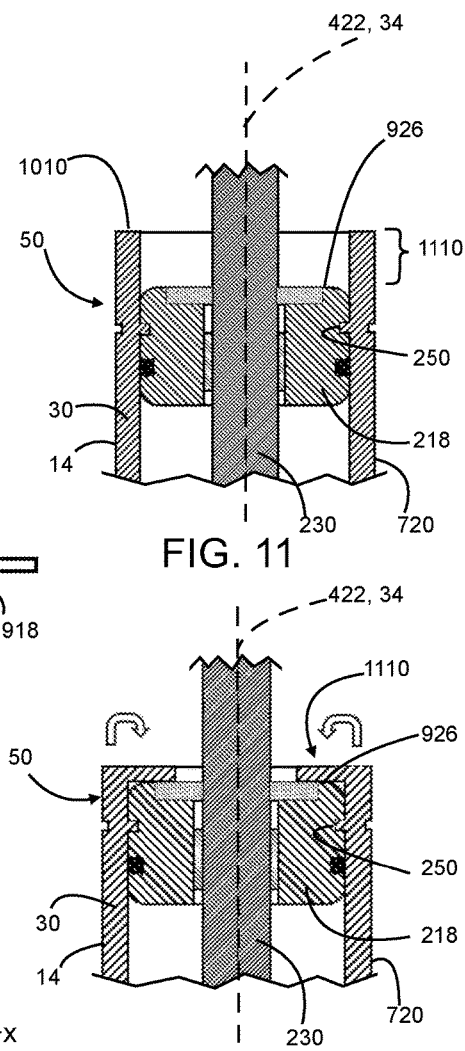
FIG. 11
FIG. 12

METHOD AND DEVICE FOR MANUFACTURING A MONOTUBE SHOCK ABSORBER

FIELD

The present disclosure relates to shock absorbers and particularly to methods and devices for manufacturing monotube shock absorbers.

BACKGROUND

The statements in this section merely provide background information related to the present disclosure and may not constitute prior art.

Shock absorbers for vehicles such as motorcycles, automobiles and trucks, among others, typically have a piston-cylinder assembly with a tube that forms a cylinder containing oil, gas, a floating piston, and a piston-rod assembly, and a rod guide disposed in the cylinder. The gas is disposed between a bottom end of the tube and the floating piston. The piston-rod assembly includes a piston connected to a rod that extends from the tube. The rod passes through the rod guide to guide movement of the rod along its central axis. The oil is disposed between the floating piston and the rod guide such that the piston of the piston-rod assembly moves within the oil.

Typically, the floating piston, piston-rod assembly, and rod guide are inserted into the tube through a top end of the tube and the gas is injected from an aperture in the bottom end of the tube. This aperture must then be plugged and sealed. In some applications, a mount configured to attach the shock absorber to a vehicle must be attached (e.g., welded) to the bottom of the tube after the aperture is sealed. An incomplete seal may provide a path for the gas to leak from the tube. Furthermore, coating (e.g., painting) the outside of the tube typically must be done after the aperture is sealed and after the mount is attached to the bottom end of the tube. Thus, the coating must be done after installation of the internal components. As a result, the tube typically cannot be e-coated since immersion of the tube in liquid coating would risk the coating infiltrating the interface between the rod and rod guide which would interfere with the movement of the rod. Instead, the rod and rod guide are typically masked and the coating is then sprayed onto the tube. In some applications, it can be difficult to thoroughly coat the tube, particularly at the sealed aperture and at the attachment of the mount incomplete coating may lead to corrosion and eventual leakage of the gas from the shock absorber.

The method and device of the present disclosure address these issues, among others, of manufacturing shock absorbers.

SUMMARY

This section provides a general summary of the disclosure and is not a comprehensive disclosure of its full scope or all of its features.

In one form of the present disclosure, a method for assembling a damper includes inserting a floating piston into a cartridge, filling a region of the cartridge with oil, inserting a piston-rod assembly into the cartridge, inserting a rod guide into the cartridge, coupling a damper tube to the cartridge, supplying a gas into the damper tube via a first end of the damper tube, transferring the floating piston, the piston-rod assembly, the rod guide, and the oil from the cartridge to the damper tube through the first end of the damper tube, and securing the rod guide to the damper tube. According to a variety of alternative configurations: the floating piston, the piston-rod assembly, and the rod guide are inserted through a first end of the cartridge and the first end of the damper tube is coupled to a second end of the cartridge; the method further includes inserting a stabilizer into an end of the cartridge, the stabilizer engaging the floating piston and inhibiting the floating piston from exiting the cartridge while inserting the piston-rod assembly from an opposite end of the cartridge; the method further includes monitoring a pressure of the gas before transferring the floating piston, the piston-rod assembly, the rod guide, and the oil from the cartridge to the damper tube; securing the rod guide to the damper tube includes deforming the damper tube to engage the rod guide; the method further includes separating the cartridge from the damper tube while holding the rod guide in the damper tube, positioning a crimp tool around the first end of the damper tube, and crimping the damper tube; the crimp tool engages the rod guide to inhibit axial movement of the rod guide relative to the damper tube while the crimp tool deforms the damper tube; the method further includes coating an exterior surface of the damper tube with a protective coating prior to coupling the damper tube to the cartridge; the step of coating the exterior surface of the damper tube includes e-coating the exterior surface of the damper tube; the method further includes operating a device that includes a plurality of stations, and moving the cartridge with the floating piston, the piston-rod assembly, the rod guide, and the oil from one station of the plurality of stations to a subsequent station of the plurality of stations, wherein the damper tube is coupled to the cartridge at the subsequent station; the plurality of stations are disposed about a central axis and moving the cartridge from the one station to the subsequent station includes rotating the cartridge about the axis; the floating piston is inserted into the cartridge at a first station of the plurality of stations and the method further includes moving the cartridge to a second station of the plurality of stations wherein the region of the cartridge is filled with the oil, moving the cartridge to a third station of the plurality of stations wherein the piston-rod assembly is inserted into the cartridge, moving the cartridge to a fourth station of the plurality of stations wherein the damper tube is coupled to the cartridge, moving the cartridge to a fifth station of the plurality of stations wherein the gas is supplied into the damper tube, moving the cartridge to a sixth station of the plurality of stations wherein the floating piston, the piston-rod assembly, the rod guide, and the oil are transferred from the cartridge to the damper tube, and moving the cartridge to a seventh station of the plurality of stations wherein the rod guide is secured to the damper tube; the method further includes moving the cartridge to an eighth station of the plurality of stations wherein a reaction force of the gas is measured.

In another form of the present disclosure, a method of assembling a damper includes inserting a floating piston into a cartridge supported by a frame at a first station, moving the cartridge to a second station and filling a region of the cartridge with oil at the second station, moving the cartridge to a third station and inserting a piston-rod assembly and rod guide into the cartridge at the third station, moving the cartridge to a fourth station and sealing a first end portion of a damper tube to the cartridge at the fourth station, moving the cartridge to a fifth station and supplying a gas into the damper tube through an aperture in the first end portion of the damper tube at the fifth station, moving the cartridge to a sixth station and transferring the floating piston, the piston-rod assembly, the oil, and the rod guide from the cartridge to the damper tube through the aperture in the first end portion of the damper tube at the sixth station, separating the cartridge from the damper tube, and moving the damper tube to a seventh station and securing the rod guide in the first end portion of the damper tube. According to an alternative configuration: moving the cartridge between stations includes rotating the frame about an axis.

In still another form of the present disclosure, a device for assembling a damper includes a frame, a cartridge, at least one linear drive, a tube support, a seal, a gas injector, an oil injector, and a crimp tool. The cartridge is supported by the frame. The at least one linear drive is configured to load internal components of the damper into the cartridge through a first end portion of the cartridge. The tube support is configured to support a damper tube. The seal is configured to sealingly couple a second end portion of the cartridge with a first end portion of the damper tube. The gas injector is coupled for fluid communication with the cartridge and configured to inject a gas into the damper tube through the first end portion of the damper tube. The oil injector is coupled for fluid communication with the cartridge and configured to inject oil into a portion of the cartridge. The crimp tool is configured to deform the first end portion of the damper tube. According to a variety of alternative configurations: the frame is rotatable about an axis, the cartridge being supported by the frame for rotation about the axis, wherein the machine further comprises a motor drivingly coupled to the frame and configured to rotate the frame about the axis; the frame is rotatable between a first station, a second station, a third station, a fourth station, a fifth station, a sixth station, a seventh station, and an eighth station, wherein at the first station the at least one linear drive loads a floating piston into the cartridge, at the second station the oil injector injects oil into the cartridge above the floating piston, at the third station the at least one linear drive loads a piston-rod assembly and rod guide into the cartridge, at the fourth station the seal couples the damper tube to the cartridge, at the fifth station the gas injector injects a gas into the damper tube, at the sixth station the at least one linear drive transfers the floating piston, the piston-rod assembly, and the rod guide into the damper tube, at the seventh station the crimp tool deforms the first end portion of the damper tube, at the eighth station a force gauge measures a reaction force of the piston-rod assembly; the machine further includes a positioning member configured to enter the second end portion of the cartridge and engage a floating piston within the cartridge to inhibit movement of the floating piston while the first linear drive loads a piston-rod assembly and rod guide into the cartridge from the first end portion of the cartridge; the crimp tool includes a shoulder configured to engage a rod guide within the damper tube to inhibit the rod guide from exiting the first end portion of the damper tube.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
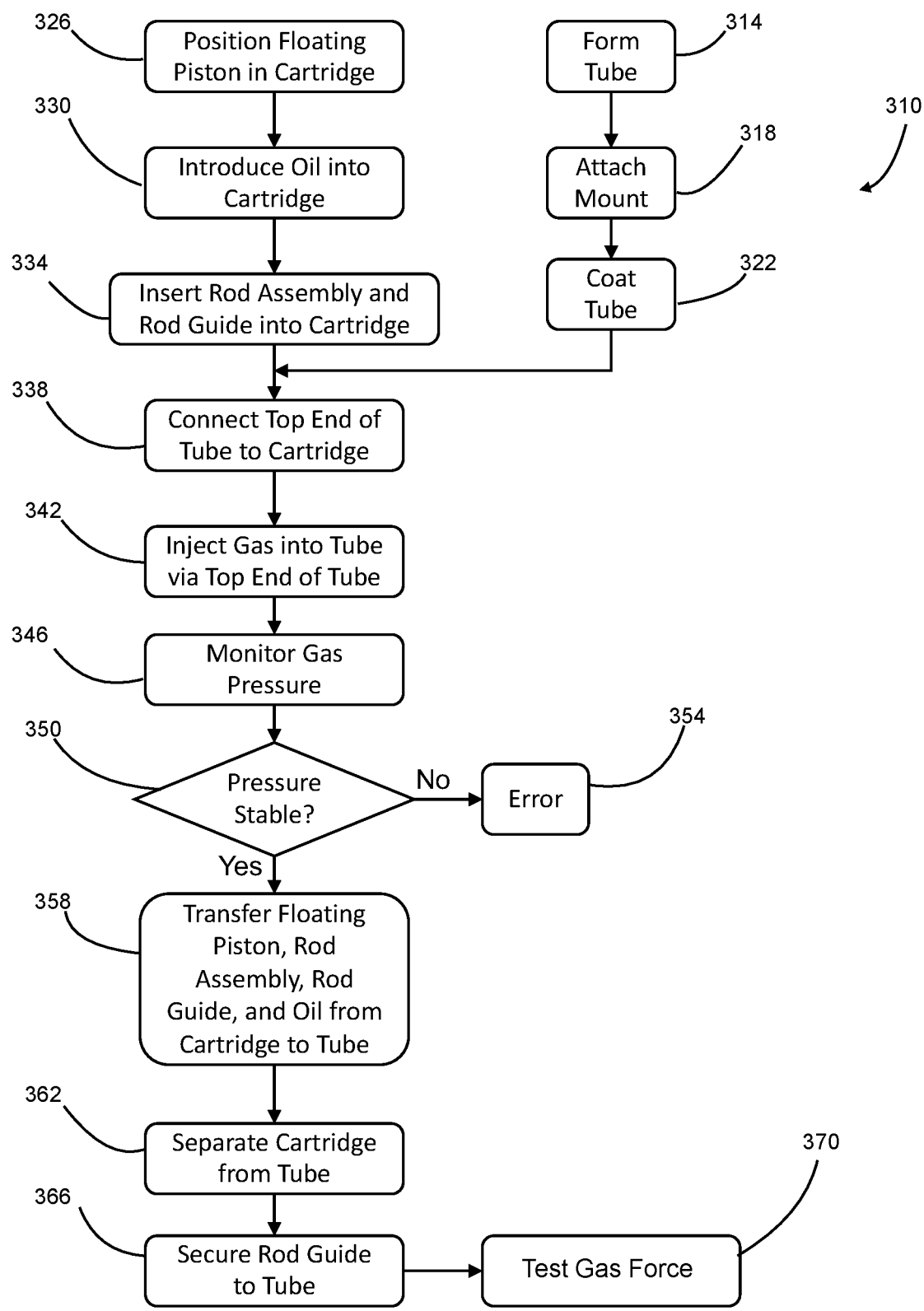
FIG. 3 is a flow chart of a method of assembling the shock absorber of FIG. 1 in accordance with the teachings of the present disclosure.
Figure 4:
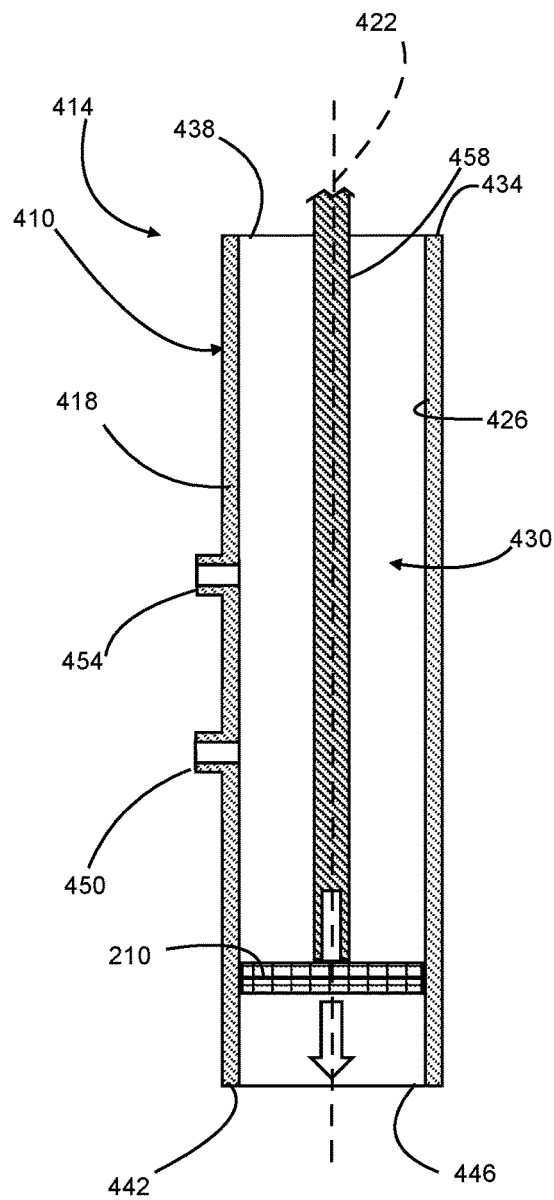
FIG. 4 is a schematic cross-sectional view of a portion of a device for assembling a shock absorber in accordance with the teachings of the present disclosure, illustrated at a step in the method of FIG. 3.
Figures 8, 9:
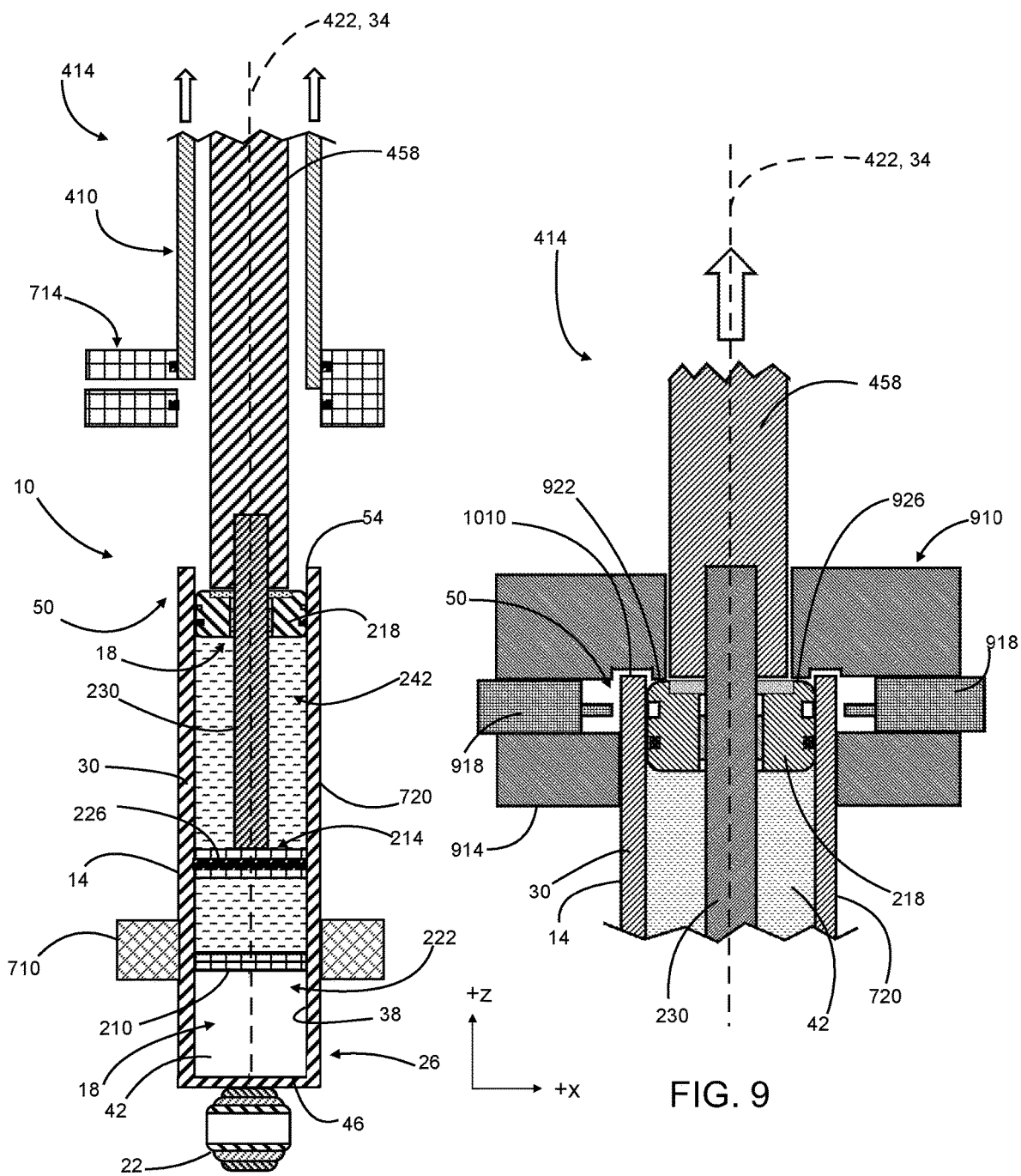
Figure 13:
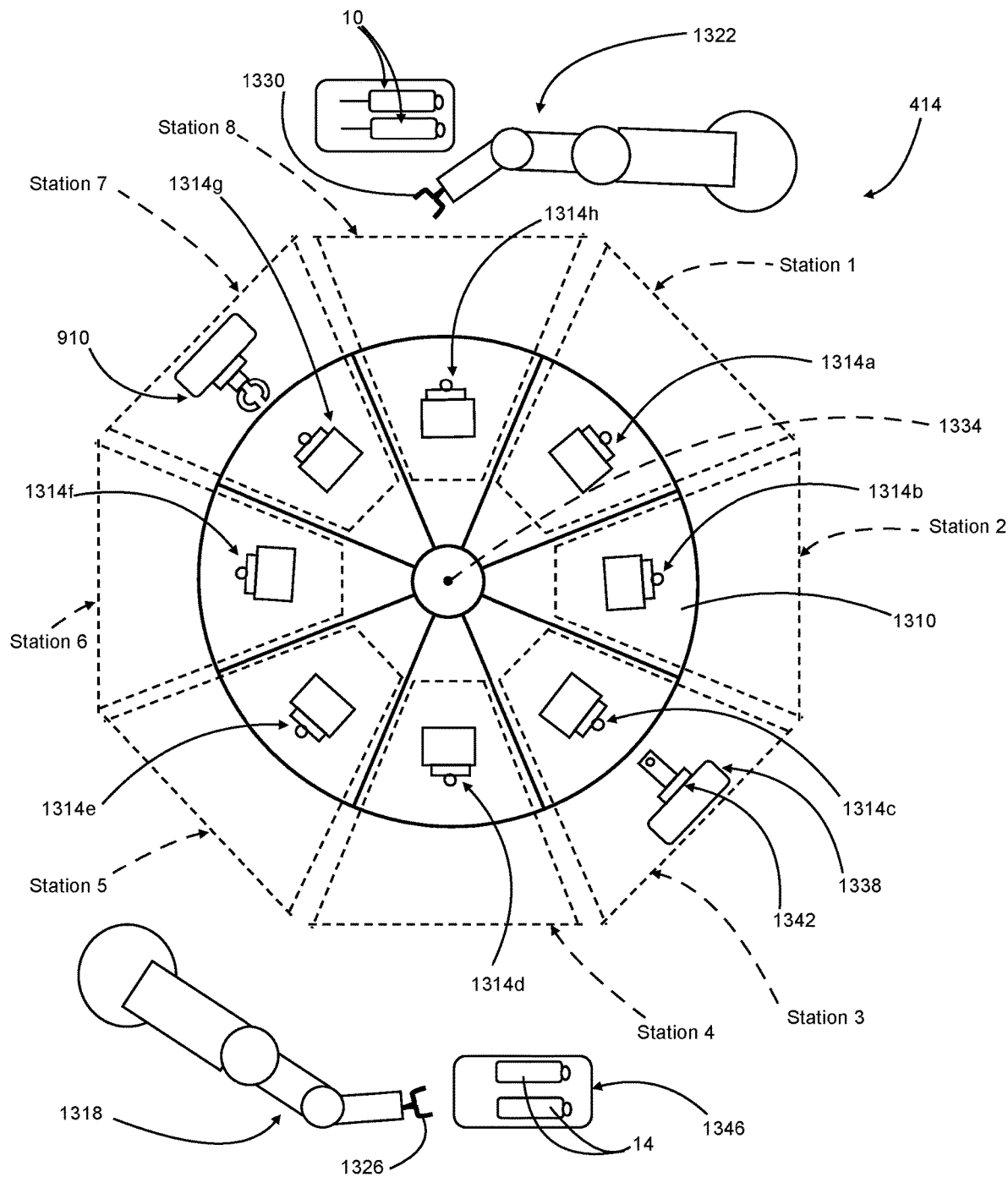
Figure 14:
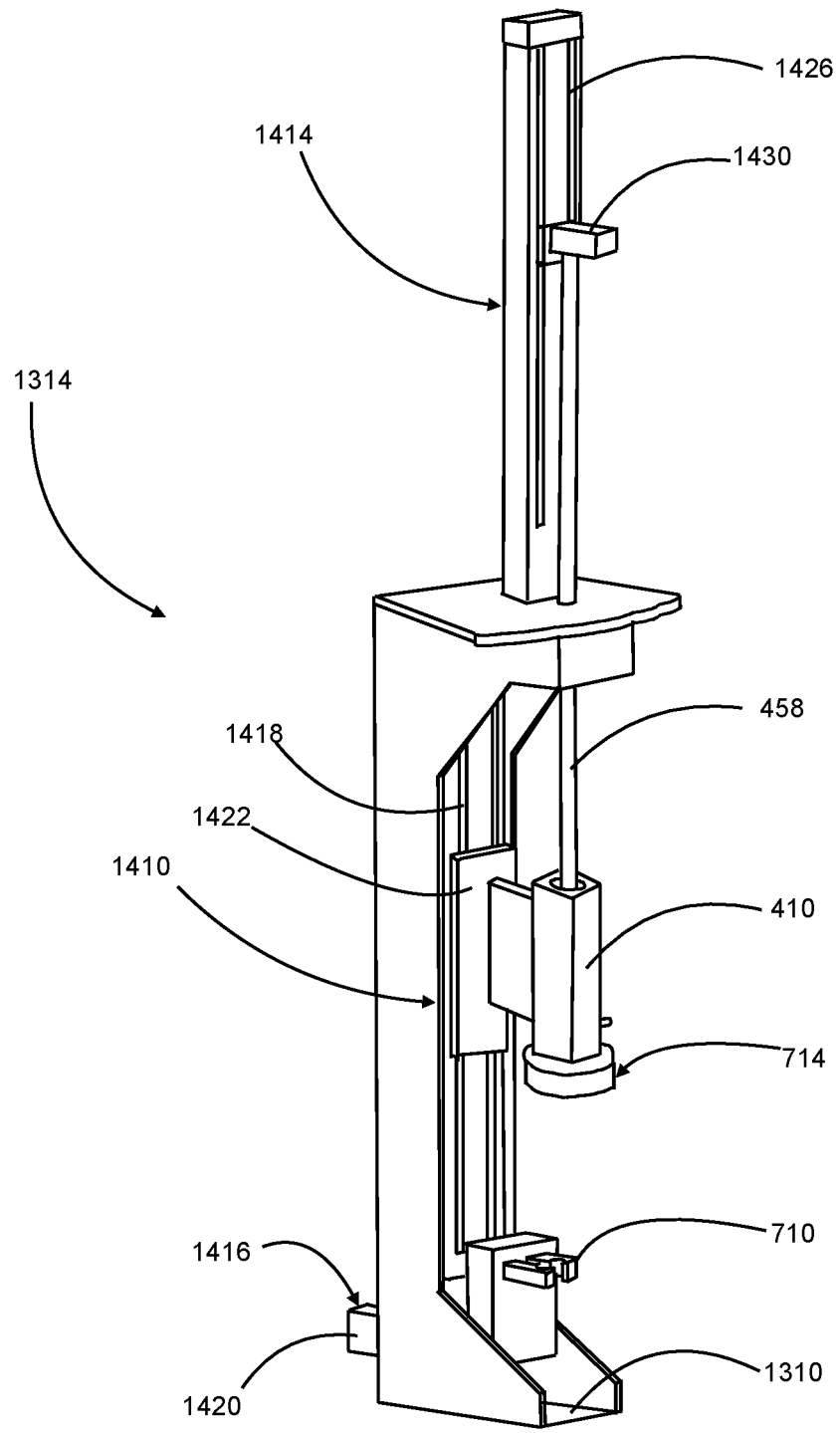
Figure 15:
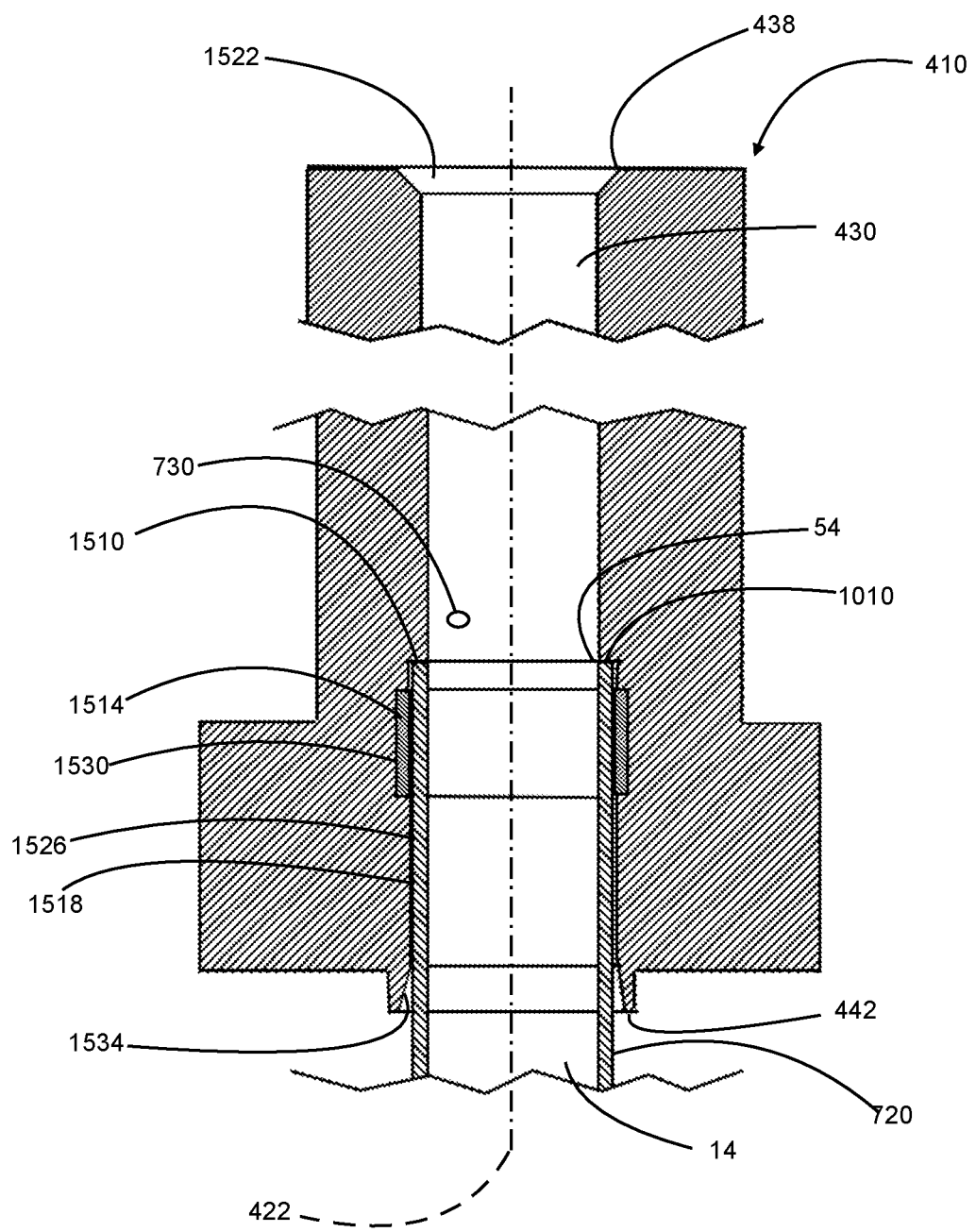

FIG. 6 a schematic cross-sectional view of a portion of the device of FIG. 4 illustrated in yet another step in the method of FIG. 3;

FIG. 7 is a schematic cross-sectional view of a portion of the device of FIG. 4 illustrated in a further step in the method of FIG. 3;

FIG. 8 is a schematic cross-sectional view of a portion of the device of FIG. 4 illustrated in still another step in the method of FIG. 3;

FIG. 9 is a schematic cross-sectional view of a portion of the device of FIG. 4 illustrated in yet a further step in the method of FIG. 3;

FIG. 10 is a schematic cross-sectional view of a portion of the device of FIG. 4 illustrated in another step in the method of FIG. 3;

FIG. 11 is a schematic cross-sectional view of a portion of a shock absorber of a second configuration in accordance with the teachings of the present disclosure, illustrating an end of the shock absorber in a first state;

FIG. 12 is a schematic cross-sectional view of the portion of the shock absorber of FIG. 11, illustrating the end of the shock absorber in a second state;

FIG. 13 is a schematic top view of the device of FIG. 4;

FIG. 14 is a schematic perspective view of a portion of the device of FIG. 4; and FIG. 15 is a schematic cross-sectional view of a portion of the device of FIG. 4 of an alternative configuration in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 1:
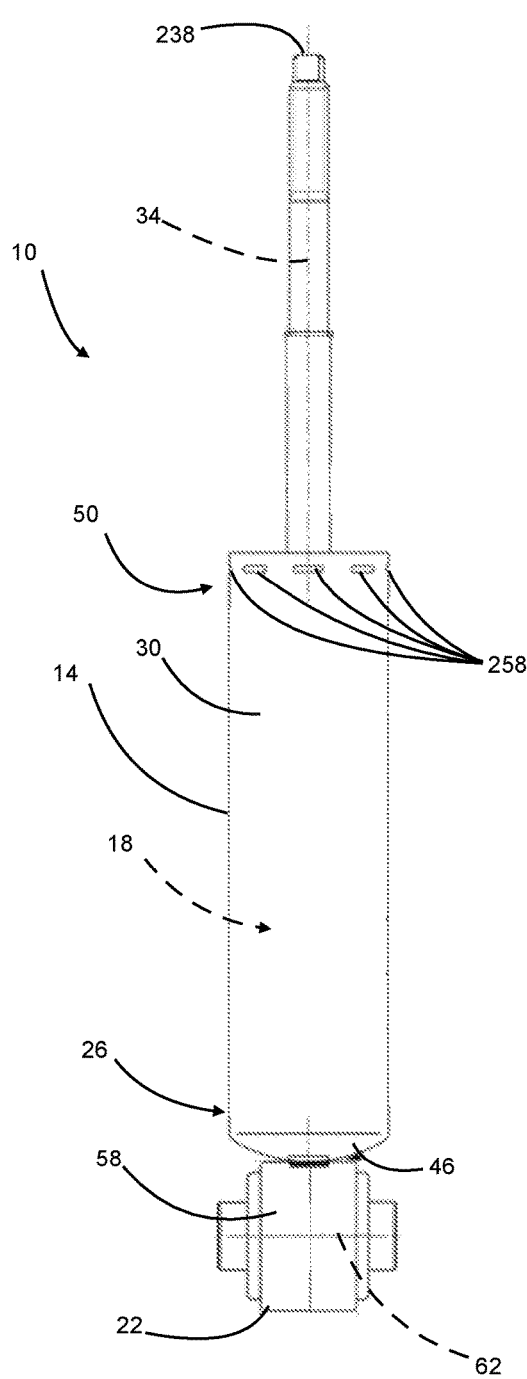
FIG. 1 is a side view of a monotube shock absorber according to the teachings of the present disclosure.
Figure 2:
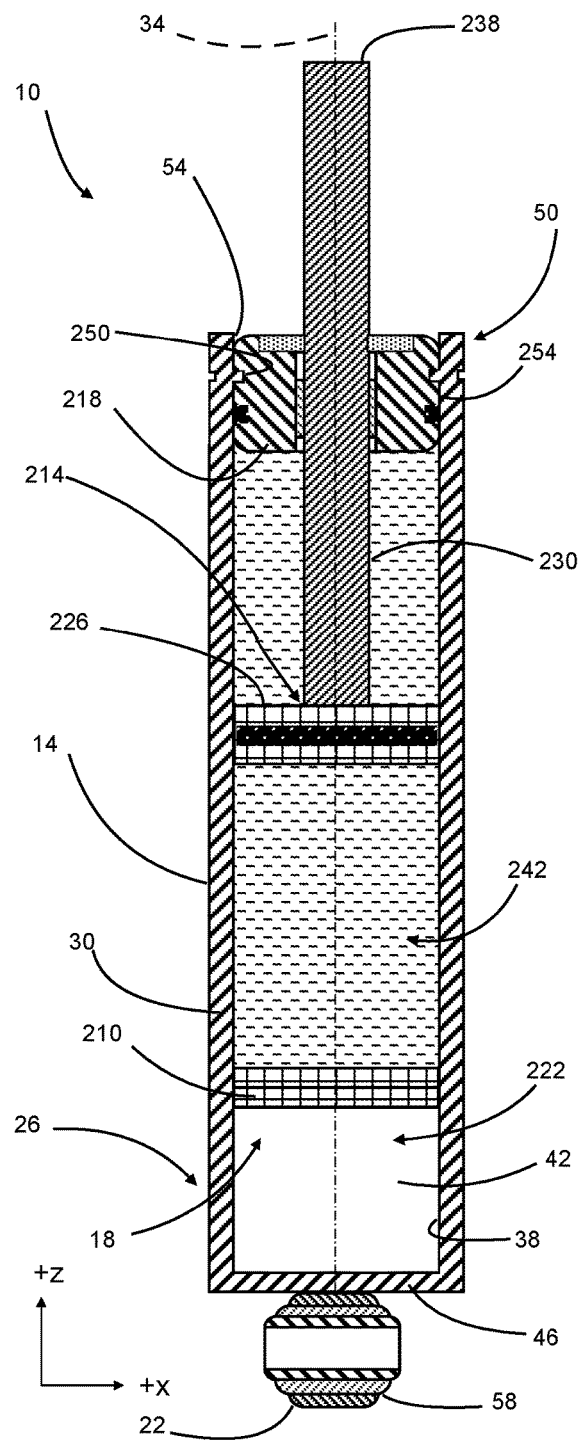
FIG. 2 is a schematic cross-sectional view of the monotube shock absorber of FIG. 1, illustrating a floating piston, a piston-rod assembly, and rod guide according to the teachings of the present disclosure.

Referring to FIGS. 1 and 2, a shock absorber 10 (i.e., a damper) is illustrated. The shock absorber 10 is a monotube type of shock absorber and includes a tube 14 and internal components 18. In the example provided, the shock absorber 10 also includes a mount 22 attached (e.g., welded) to a bottom end portion 26 of the tube 14. The tube 14 includes a tube wall 30 that is generally cylindrical in shape and disposed about a central axis 34 of the shock absorber 10. An internal surface 38 of the tube wall 30 defines a cylindrical cavity 42 also referred to herein as the cylinder 42. The bottom end portion 26 includes an end wall 46 of the tube 14. In one configuration, shown in FIG. 1, the end wall 46 may be curved. In another configuration, shown in FIG. 2, the end wall 46 may be flat. The end wall 46 closes and defines the bottom of the cylinder 42. A top end portion 50 of the tube 14 defines an aperture 54.

The mount 22 is configured to connected to a portion of a vehicle suspension (not shown; e.g., a control arm). In the example provided, the mount 22 includes an annular body 58 disposed about an axis 62 that is perpendicular to the central axis 34. In an alternative configuration, not shown, the tube 14 may not include the mount 22 and the bottom end portion 26 can be supported directly by portion of the vehicle suspension (not shown).

Referring to FIG. 2, the internal components 18 include a floating piston 210, a piston-rod assembly 214, and a rod guide 218. The floating piston 210 is disposed coaxially within the cylinder 42 and is in sealed, sliding contact with the internal surface 38 of the tube wall 30 such that the floating piston 210 may move axially within the cylinder 42. The floating piston 210 is disposed proximate to the bottom end portion 26 of the tube 14 and cooperates with the bottom end portion 26 to define a lower reservoir 222. In the example provided, the lower reservoir 222 is filled with a pressurized gas (e.g., air or nitrogen). Accordingly, the lower reservoir 222 is also referred to herein as the gas reservoir 222.

The piston-rod assembly 214 includes a piston 226 and a rod 230. The piston 226 is disposed coaxially within the cylinder 42 and configured to move axially therein. In the example provided, the piston 226 is in sliding contact with the internal surface 38 of the tube wall 30. The piston 226 can include one or more valves (not shown) to permit fluid to pass through the piston 226 in a controlled manner based on the velocity of the piston 226. The rod 230 is disposed coaxially with the piston 226 and is coupled thereto for axial movement with the piston 226. The rod 230 extends through the aperture 54 of the tube 14. While not specifically shown, the rod 230 may include a rod mount attached (e.g., threaded or welded) to an end 238 of the rod 230.

The rod guide 218 is disposed about the rod 230 within the cylinder 42 proximate to the top end portion 50 of the tube 14. The rod guide 218, the tube wall 30 and the floating piston 210 cooperate to define an upper reservoir 242 within the cylinder 42. In the example provided, the upper reservoir 242 is filled with an oil. Accordingly, the upper reservoir 242 is also referred to herein as the oil reservoir 242. The rod guide 218 is configured to sealingly engage the tube wall 30 and the rod 230 to inhibit oil from leaking from the aperture 54 as the rod 230 moves axially relative to the rod guide 218. The rod guide 218 includes a groove 250 disposed about an outer surface 254 of the rod guide 218. The tube wall 30 at the top end portion 50 of the tube 14 is deformed (e.g., crimped) into the groove 250 to secure the rod guide 218 axially within the cylinder 42. In the example provided, the tube wall 30 is crimped at distinct locations 258 about the circumference of the tube 14, though other configurations can be used.

Referring to FIG. 3, a method 310 of manufacturing the shock absorber 10 of FIGS. 1 and 2 is illustrated. At step 314, the tube 14 is formed. The tube 14 can be formed in any suitable method. In one example, the tube wall 30 may be extruded and the end wall 46 may be welded to the tube wall 30. After forming the tube 14, the mount 22 may be attached to the tube 14 at step 318. In one example, the mount 22 is welded to the end wall 46. In an alternative configuration, such as when the shock absorber does not include the mount 22, step 318 can be omitted. After forming the tube and attaching the mount 22, at least a portion of the exterior of the tube 14 and the mount 22 are coated at step 322.

In the example provided, the tube 14 and the mount 22 are e-coated (e.g., KTL paint) such that they are immersed in a container of liquid coating material (e.g., paint) and an electric current is used to cause the coating material to adhere or bond to the tube 14 and the mount 22. Areas of the tube 14 and/or the mount 22 may optionally be masked or temporarily sealed off to inhibit coating of those areas. In the example provided, the area of the tube 14 where the tube wall 30 is crimped (i.e., at locations 258) is masked off and the aperture 54 is temporarily plugged to inhibit coating the cylinder 42 and the area of the tube wall 30 that will subsequently be deformed.

At step 326 and with additional reference to FIG. 4, the floating piston 210 is positioned in a cartridge 410 of a shock absorber assembly device 414. The cartridge 410 includes a cartridge wall 418 disposed about a central axis 422. An inner surface 426 of the cartridge wall 418 is cylindrical in shape to define a cartridge cavity 430 that is approximately the same diameter as the cylinder 42 (FIG. 2). A top end 434 of the cartridge wall 418 is open to define a top cartridge aperture 438 and a bottom end 442 of the cartridge wall 418 is open to define a bottom cartridge aperture 446. The cartridge 410 can include a port 450 configured to introduce a fluid (e.g., oil) into the cartridge cavity 430. In the example provided, the cartridge 410 may also include a port 454 axially spaced apart from the port 450. The port 454 can also be configured to introduce the fluid into the cartridge cavity 430.

In the example provided, the floating piston 210 is inserted into the cartridge cavity 430 through the top cartridge aperture 438 and a pusher member 458 of the assembly device 414 translates the floating piston 210 down in the cartridge cavity 430 until the floating piston 210 is in a predetermined position below the ports 450, 454. The floating piston 210 can form a seal with the inner surface 426 of the cartridge wall 418 and friction therebetween can inhibit the floating piston from exiting the bottom cartridge aperture 446.

Figure 5:
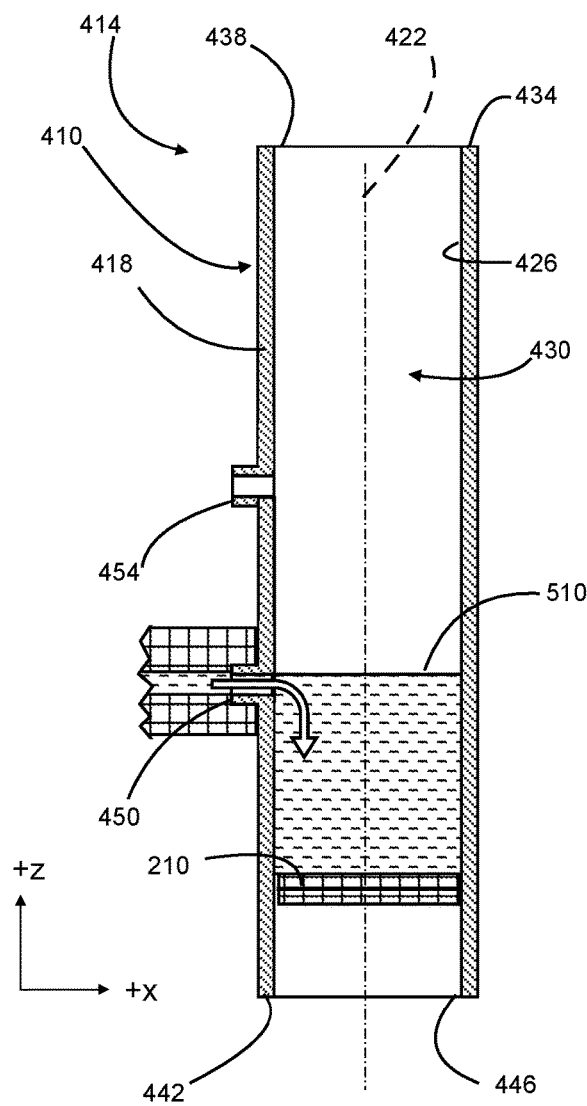
FIG. 5 is a schematic cross-sectional view of a portion of the device of FIG. 4 illustrated in another step in the method of FIG. 3.

At step 330 and with additional reference to FIG. 5, a fluid (e.g., oil 510) can be injected into the cartridge cavity 430 via the port 450. The oil 510 is retained within the cartridge cavity 430 by the floating piston 210 and fills at least a portion of the cartridge cavity 430.

At step 334 and with additional reference to FIG. 6, the piston-rod assembly 214 and the rod guide 218 are inserted into the cartridge cavity 430 via the top cartridge aperture 438. In the example provided, a positioning member 610 (i.e., a stabilizer) of the assembly device 414 is inserted up through the bottom cartridge aperture 446 to engage the floating piston 210 and inhibit the floating piston 210 from being pushed downward out of the cartridge 410 during insertion of the piston-rod assembly 214 and the rod guide

218. The positioning member 610 can ensure the floating piston 210 remains in the predetermined position. In the example provided, the positioning member 610 includes a bore 614 coupled to a vacuum device 618 for fluid communication therewith. Apertures 622 through the positioning member 610 permit the vacuum device 618 to remove any residual oil from the inner surface 426 of the cartridge wall 418.

In the example provided, the oil 510 may be introduced via the port 454 once the piston 226 of the piston-rod assembly 214 is below the port 454. In an alternative configuration, not specifically shown, the piston may simply move through the cartridge cavity 430 and the oil 510 may pass through the valves (not shown) in the piston 226 to fill the space between the floating piston 210 and the rod guide 218. In the example provided, the pusher member 458 moves the piston-rod assembly 214 and the rod guide 218 into the cartridge cavity 430. In an alternative configuration, not specifically shown, separate pushers may act on the piston-rod assembly 214 and the rod guide 218 respectively.

After the cartridge cavity 430 is filled with oil 510 and the piston-rod assembly 214 and the rod guide 218 are in position within the cartridge 410, the positioning member 610 is removed. The oil 510 is not compressed within the cartridge 410 such that once the piston-rod assembly 214 and the rod guide 218 are in position, the friction between the floating piston 210 and the cartridge cavity 430 is sufficient to maintain the internal components 18 and oil 510 within the cartridge cavity 430.

At step 338 and with additional reference to FIG. 7, the tube 14 is moved into position below the cartridge 410 such that the tube 14 and the cartridge 410 are coaxial. In the example provided, a tube clamp 710 grips and supports the tube 14. The tube 14 is then sealingly connected to the cartridge 410 such that the aperture 54 of the tube 14 is open to the bottom cartridge aperture 446. In the example provided, a sealing ring 714 is disposed about the juncture of the tube 14 and the cartridge 410 and includes a seal member 718 (e.g., an O-ring) that engages and seals with an outer surface 720 of the tube 14. In the example provided, the sealing ring 714 is a separate component from the cartridge 410 and includes a seal member 722 (e.g., an O-ring) that seals on an exterior surface 726 of the cartridge 410. In the example provided, the sealing ring 714 includes a port 730 in fluid communication with the cylinder 42 and configured to introduce a pressurized gas (e.g., air or nitrogen) into the cylinder 42 via the aperture 54. In an alternative configuration, not specifically shown, the sealing ring 714 can be integrally formed with the cartridge 410 such that the separate seal member 722 between the sealing ring 714 and the cartridge 410 is not needed.

Referring to FIG. 15, an alternative configuration of the cartridge 410 is illustrated. The cartridge 410 shown in FIG. 15 is similar to the cartridge 410 shown and described with reference to FIGS. 4-8 except as otherwise shown and described herein. The cartridge 410 of FIG. 15 includes a shoulder 1510, a seal member 1514, and a second cartridge cavity 1518. The cartridge cavity 430 includes a tapered face 1522 at the top cartridge aperture 438 to aid in inserting the internal components 18 (FIG. 6).

The second cartridge cavity 1518 is disposed below the cartridge cavity 430 and defined by an inner surface 1526 of the cartridge 410 to have a diameter greater than the diameter of the cartridge cavity 430. As described above, the diameter of the cartridge cavity 430 is approximately equal to the diameter of the aperture 54 of the tube 14. The diameter of the second cartridge cavity 1518 is slightly larger than the outer diameter of the tube 14 (i.e., of the outer surface 720). The shoulder 1510 extends radially between the cartridge cavity 430 and the second cartridge cavity 1518. The seal member 1514 is an annular body disposed about the central axis 422 within the second cartridge cavity 1518 and can be received in a circumferential groove 1530 formed therein. The second cartridge cavity 1518 includes a tapered face 1534 that tapers outward toward the bottom end 442 of the cartridge 410 to aid in insertion of the tube 14 therein. The tube 14 is inserted into the cartridge 410 until the top-most surface 1010 of the tube 14 abuts the shoulder 1510. The seal member 1514 is a resilient material and can extend radially inward of the inner surface 1526 to seal with the outer surface 720 of the tube 14.

In this example, the port 730 through which gas is inserted is disposed in the cartridge cavity 430, i.e., above the shoulder 1510. In this example configuration, the cartridge 410 does not include the ports 450 or 454 for oil. Instead, the oil is poured in through the top cartridge aperture 438. In yet another alternative configuration, not specifically shown, the cartridge 410 of FIG. 15 may include one or more ports similar to ports 450 and 454 to directly inject oil into the cartridge cavity 430.

Returning to the method 310 of FIG. 3, at step 342 and with reference to FIG. 7, the pressurized gas is injected from the port 730, through the aperture, and into the cylinder 42 below the floating piston 210. The gas is injected to a predetermined pressure.

At step 346 the gas pressure is monitored for a predetermined amount of time using a pressure sensor 734. At step 350, if the gas pressure is not stable, then the assembly device 414 indicates an error at step 354. If the gas pressure is stable, then the method can proceed to step 358. The predetermined pressure can be based on the desired damping characteristics of the shock absorber 10 and the displacement through which the floating piston 210 will be translated when transferred into the tube 14 from the cartridge 410. In other words, the predetermined pressure can be different than the design pressure of the air reservoir such that moving the internal components to their final design positions (shown in FIG. 2) will cause the pressure of the gas in the gas reservoir 222 (FIG. 2) to be the design pressure.

At step 358, the pusher member 458 moves the rod 230 and the rod guide 218 down, which also causes the oil 510 and the floating piston 210 to move down. The pusher member 458 acts on the rod 230 and the rod guide 218 until the oil 510, the floating piston 210, the piston 226, and the rod guide 218 move through the aperture 54 and are all within the cylinder 42 as shown in FIG. 8.

At step 362 and referring to FIG. 8, the cartridge 410 is separated from the tube 14. The gas in the gas reservoir 222 is under pressure and the pusher member 458 remains engaged with the rod guide 218 to inhibit the rod guide 218 from being expelled from the cylinder 42 via the aperture 54.

With reference to FIG. 9, a crimp tool 910 of the assembly device 414 is then moved into position about the top end portion 50 of the tube 14. The crimp tool 910 includes a main body 914 and crimp jaws 918. In the example provided, the main body 914 includes a shoulder 922 that is radially inward of the tube wall 30 and engages a top surface 926 of the rod guide 218 to inhibit the rod guide 218 from moving axially out of the cylinder 42. Thus, the shoulder 922 maintains the rod guide 218 in the final design position and the pusher member 458 may then be retracted.

At step 366 and with additional reference to FIG. 10, the crimp jaws 918 are moved radially inward. The crimp jaws 918 contact the outer surface 720 of the tube 14 at a location that is axially below the top-most surface 1010 of the tube 14. Movement of the crimp jaws 918 radially inward deforms the top end portion 50 radially inward into the groove 250 of the rod guide 218 to secure the rod guide 218 in the tube 14.

Referring to FIGS. 11 and 12, an alternative configuration of the tube 14 is illustrated. In this configuration, the tube 14 and method of manufacturing the tube 14 (i.e., method 310) are similar to those described above with reference to FIGS. 1-10 except that a region 1110 of the top end portion 50 of the tube 14 extends above the rod guide 218 after crimping. In this configuration, the step 366 of securing the rod guide 218 in the tube 14 can further include deforming (e.g., cold rolling) the region 1110 radially inward to contact the top surface 926 of the rod guide 218 and further retain the rod guide 218 within the tube 14. The deforming of the region 1110 can be done by a component (not shown) of the assembly device 414 (FIGS. 3-10 and 13-15) or a separate device (not shown) after being removed from the assembly device 414 (FIGS. 3-10 and 13-15).

Returning to the method 310 of FIG. 3 and with additional reference to FIGS. 1 and 2, after securing the rod guide 218 in the tube 14, the method 310 can proceed to step 370 wherein the gas force of the shock absorber 10 is tested. The assembly device 414 can include a drive member (not specifically shown) that can grip or attach to the rod 230. The drive member (not shown) moves the rod 230 axially and a sensor (not shown; e.g., a force sensor) measures the force needed to move the rod 230 against the gas in the gas reservoir 222.

Referring to FIG. 13, the assembly device 414 can include a frame spindle 1310 and a plurality of operating assemblies 1314a, 1314b, 1314c, 1314d, 1314e, 1314f, 1314g, 1314h (collectively or generically referred to as operating assembly 1314). In the example provided, the device also includes a loading arm 1318 and an loading arm 1322. The loading arm 1318 may optionally be a robotic arm (e.g., multi-axis robotic arm) with a gripper 1326. The loading arm 1322 may also optionally be a robotic arm (e.g., multi-axis robotic arm) with a gripper 1330.

The frame spindle 1310 is supported for rotation about an axis 1334 relative to the loading and unloading arms 1318, 1322. The operating assembly 1314 are arranged on the frame spindle 1310 about the axis 1334 such that rotation of the frame spindle 1310 moves the operating assembly 1314 through individual stations (e.g., stations 1, 2, 3, 4, 5, 6, 7, and 8, collectively referred to as stations 1-8) of the assembly device 414 wherein steps of the manufacturing method 310 (FIG. 3) are performed. Each station 1-8 is configured to perform a predetermined step or steps of the method 310 (FIG. 3). For example, when operating assembly 1314a is at station 1, operating assembly 1314h is at station 8 and performing a different step(s) in the method 310 (FIG. 3) than operating assembly 1314a. The frame spindle 1310 can then rotate so that operating assembly 1314a is at station 2 and operating assembly 1314h is at station 1. Rotation of the frame spindle 1310 can proceed in this manner such that each operating assembly 1314 passes to each station 1-8.

Referring to FIG. 14, one of the operating assembly 1314 is illustrated. The operating assembly 1314 includes the cartridge 410, the pusher member 458, the tube clamp 710, a first linear drive 1410, a second linear drive 1414 and a third linear drive 1416. In the example provided, the cartridge 410 is attached to the frame spindle 1310 by the first linear drive 1410. The first linear drive 1410 is coupled to the frame spindle 1310 and configured to move the cartridge 410 vertically (i.e., in the positive and negative z directions) relative to the frame spindle 1310. In the example provided, the first linear drive 1410 includes a track 1418, a cartridge support 1422 that supports the cartridge 410 for movement on the track 1418, and a motor (not shown) that drives the cartridge support 1422 along the track 1418, though other types of linear drives can be used.

The second linear drive 1414 is coupled to the frame spindle 1310 and configured to move the pusher member 458 vertically (i.e., in the positive and negative z directions) relative to the frame spindle 1310. In the example provided, the second linear drive 1414 includes a track 1426, a pusher support 1430 that supports the pusher member 458 for movement on the track 1426, and a motor (not shown) that drives the pusher support 1430 along the track 1426, though other types of linear drives can be used.

The tube clamp 710 is disposed below the cartridge 410 and is configured to selectively grip the tube 14 (FIG. 7) to support the tube 14 relative to the cartridge 410. The third linear drive 1416 is configured to move the tube clamp 710 vertically (i.e., in the positive and negative z directions) relative to the frame spindle 1310. In the example provided, the third linear drive 1416 includes a piston-cylinder device 1420 (e.g., a pneumatic or hydraulic piston-cylinder) configured to drive a ramp (not specifically shown) to cause the tube clamp 710 to raise or lower, though other types of linear drives can be used.

Referring to FIGS. 13 and 14, at station 1, the step 326 (FIG. 3) is performed such that the floating piston 210 (FIG. 4) is positioned in the cartridge 410.

At station 2, step 330 is performed such that the oil 510 (FIG. 5) is introduced into the cartridge 410.

At station 3, step 334 is performed such that the piston-rod assembly 214 (FIG. 6) and the rod guide 218 (FIG. 6) are inserted into the cartridge 410. A positioning device 1338 (shown in FIG. 13) is disposed in station 3 and includes the positioning member 610 and a linear drive 1342 (FIG. 13) configured to raise and lower the positioning member 610 relative to the cartridge 410 as discussed with reference to step 334. In an alternative configuration, not shown, the positioning device 1338 may be part of each operating assembly 1314 such that it is mounted to the frame spindle 1310 for rotation therewith.

At station 4, the step 338 (FIG. 3) is performed such that the tube 14 (FIG. 7) is connected to the cartridge 410. At station 4, the loading arm 1318 can take the tube 14 from a staging area 1346 of the tubes 14 and move it to the tube clamp 710. The tube clamp 710 grips the tube 14 and can move the tube 14 up to seal with the cartridge 410. A force gage (not specifically shown) can measure a force needed to move the tube 14 to ensure that the tube 14 has reached the proper sealed position.

At station 5, the step 342 (FIG. 3) is performed such that the gas is injected into the tube 14.

The steps 346 and 350 (FIG. 3) wherein the gas pressure is monitored, can be completed at station 5 or station 6 before step 358.

At station 6, the step 358 (FIG. 3) is performed such that the internal components 18 (FIG. 8) and oil 510 (FIG. 8) are transferred to the tube 14 (FIG. 8). The step 362 wherein the cartridge 410 is separated from the tube 14 (FIG. 8) can be completed at station 6 or station 7. The first linear drive 1410 can move the cartridge 410 vertically to separate it from the tube 14 (FIG. 8).

At station 7, the step 366 (FIG. 3) is performed such that the rod guide 218 (FIGS. 9-10 and optionally FIGS. 11-12) is secured in the tube 14 (FIGS. 9-12) by the crimp tool 910.

At station 8, the step 370 is performed such that the gas force is tested. After step 370, the loading arm 1322 can remove the shock absorber 10 from the tube clamp 710.

While described and shown herein with eight stations, more or fewer stations may be used such that more or fewer steps are completed at each station respectively.

When an element or layer is referred to as being "on," "engaged to," "connected to" or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of assembling a damper comprising:
   inserting a floating piston into a cartridge;
   engaging the floating piston with a stabilizer within the cartridge;
   filling a region of the cartridge with oil;
   inserting a piston-rod assembly into the cartridge, wherein engagement of the stabilizer with the floating piston inhibits the floating piston from exiting the cartridge while inserting the piston-rod assembly into the cartridge;
   inserting a rod guide into the cartridge;
   coupling a damper tube to the cartridge;
   supplying a gas into the damper tube via a first end of the damper tube;
   transferring the floating piston, the piston-rod assembly, the rod guide, and the oil from the cartridge to the damper tube through the first end of the damper tube; and
   securing the rod guide to the damper tube.

2. The method according to claim 1, wherein the floating piston, the piston-rod assembly, and the rod guide are inserted through a first end of the cartridge and the first end of the damper tube is coupled to a second end of the cartridge.

3. The method according to claim 1, wherein the stabilizer is inserted into an end of the cartridge and inhibits the floating piston from exiting the end of the cartridge while inserting the piston-rod assembly from an opposite end of the cartridge.

4. The method according to claim 1 further comprising monitoring a pressure of the gas before transferring the floating piston, the piston-rod assembly, the rod guide, and the oil from the cartridge to the damper tube.

5. The method according to claim 1, wherein securing the rod guide to the damper tube includes deforming the damper tube to engage the rod guide.

6. The method according to claim 1 further comprising:
   separating the cartridge from the damper tube while holding the rod guide in the damper tube;

positioning a crimp tool around the first end of the damper tube; and crimping the damper tube.

7. The method according to claim 6, wherein the crimp tool engages the rod guide to inhibit axial movement of the rod guide relative to the damper tube while the crimp tool deforms the damper tube.

8. The method according to claim 1 further comprising coating an exterior surface of the damper tube with a protective coating prior to coupling the damper tube to the cartridge.

9. The method according to claim 8, wherein the step of coating the exterior surface of the damper tube includes e-coating the exterior surface of the damper tube.

10. The method according to claim 1 further comprising:
operating a device that includes a plurality of stations; and
moving the cartridge with the floating piston, the piston-rod assembly, the rod guide, and the oil from one station of the plurality of stations to a subsequent station of the plurality of stations, wherein the damper tube is coupled to the cartridge at the subsequent station.

11. The method according to claim 1, wherein the step of filling the region of the cartridge with oil fills a first region of the cartridge, wherein the method further includes filling a second region of the cartridge with oil after inserting the piston-rod assembly into the cartridge, wherein a piston of the piston-rod assembly separates the first region of the cartridge from the second region of the cartridge.

12. The method according to claim 1 further comprising operating a vacuum device to vacuum an inner surface of the cartridge.

13. The method according to claim 12, wherein the vacuum device is connected to the stabilizer and the stabilizer includes an aperture through which the vacuum device vacuums the inner surface of the cartridge.

14. A method of assembling a damper comprising:
inserting a floating piston into a cartridge;
filling a region of the cartridge with oil;
inserting a piston-rod assembly into the cartridge;
inserting a rod guide into the cartridge;
coupling a damper tube to the cartridge;
supplying a gas into the damper tube via a first end of the damper tube;
transferring the floating piston, the piston-rod assembly, the rod guide, and the oil from the cartridge to the damper tube through the first end of the damper tube; and
securing the rod guide to the damper tube, wherein the method further comprises:
operating a device that includes a plurality of stations; and
moving the cartridge with the floating piston, the piston-rod assembly, the rod guide, and the oil from one station of the plurality of stations to a subsequent station of the plurality of stations, wherein the damper tube is coupled to the cartridge at the subsequent station.

15. The method according to claim 14, wherein the plurality of stations are disposed about a central axis and moving the cartridge from the one station to the subsequent station includes rotating the cartridge about the central axis.

16. The method according to claim 15, wherein the floating piston is inserted into the cartridge at a first station of the plurality of stations, the method further comprising:
moving the cartridge to a second station of the plurality of stations wherein the region of the cartridge is filled with the oil;
moving the cartridge to a third station of the plurality of stations wherein the piston-rod assembly is inserted into the cartridge;
moving the cartridge to a fourth station of the plurality of stations wherein the damper tube is coupled to the cartridge;
moving the cartridge to a fifth station of the plurality of stations wherein the gas is supplied into the damper tube;
moving the cartridge to a sixth station of the plurality of stations wherein the floating piston, the piston-rod assembly, the rod guide, and the oil are transferred from the cartridge to the damper tube; and
moving the cartridge to a seventh station of the plurality of stations wherein the rod guide is secured to the damper tube.

17. The method according to claim 16 further comprising moving the cartridge to an eighth station of the plurality of stations wherein a reaction force of the gas is measured.

18. A method of assembling a damper comprising:
inserting a floating piston into a cartridge supported by a frame at a first station;
moving the cartridge to a second station and filling a region of the cartridge with oil at the second station;
moving the cartridge to a third station and inserting a piston-rod assembly and rod guide into the cartridge at the third station;
moving the cartridge to a fourth station and sealing a first end portion of a damper tube to the cartridge at the fourth station;
moving the cartridge to a fifth station and supplying a gas into the damper tube through an aperture in the first end portion of the damper tube at the fifth station;
moving the cartridge to a sixth station and transferring the floating piston, the piston-rod assembly, the oil, and the rod guide from the cartridge to the damper tube through the aperture in the first end portion of the damper tube at the sixth station;
separating the cartridge from the damper tube; and
moving the damper tube to a seventh station and securing the rod guide in the first end portion of the damper tube.

19. The method according to claim 18, wherein moving the cartridge between stations includes rotating the frame about an axis.

20. A method of assembling a damper comprising:
inserting a floating piston into a cartridge;
filling a region of the cartridge with oil;
inserting a piston-rod assembly into the cartridge;
inserting a rod guide into the cartridge;
coupling a damper tube to the cartridge;
supplying a gas into the damper tube via a first end of the damper tube;
transferring the floating piston, the piston-rod assembly, the rod guide, and the oil from the cartridge to the damper tube through the first end of the damper tube; and
securing the rod guide to the damper tube,
wherein the method further comprises coating an exterior surface of the damper tube with a protective coating prior to coupling the damper tube to the cartridge,
wherein the step of coating the exterior surface of the damper tube includes e-coating the exterior surface of the damper tube.

* * * * *